May 13, 1941. A. J. BERG ET AL 2,241,388

SPRING AND METHOD OF MAKING THE SAME

Original Filed Dec. 8, 1937

INVENTORS
ALFRED J. BERG
JOHN O. HUSE
BY W. Glenn Jones
ATTORNEY

UNITED STATES PATENT OFFICE 2,241,388

SPRING AND METHOD OF MAKING THE SAME

Alfred J. Berg, Portsmouth, N. H., and John O. Huse, United States Navy

Original application December 8, 1937, Serial No. 178,698. Divided and this application December 15, 1939, Serial No. 309,420

2 Claims. (Cl. 267—1)

(Granted under the act of March 3, 1883, as amended April 30, 1928; 370 O. G. 757)

Our invention relates primarily to a new and useful method of and tool for making a spring.

This invention is an improvement upon our invention disclosed in an application for Letters Patent entitled "Spring and method of making the same," Serial No. 178,698 and filed December 8, 1937, and to which reference may be had for a fuller understanding of the present invention and the problems overcome thereby.

Instead of making springs from the more expensive forms of metal, which are rolled or drawn to the shape in cross section desired for the spring, we shear-cut the spring of its desired shape and cross section from a larger piece which is a comparatively inexpensive form of the metal.

We have found that our present invention produces a very useful, durable and efficient spring at a substantially lesser cost than has been heretofore possible with the employment of the prior practice of making springs.

While springs of many kinds may be advantageously made by our invention, the same is very advantageously employable in the making of the usually more expensive form of spring known as the helically coiled spring.

According to our invention embodied in the beforestated application, the spring is cut from larger metal by a cutter having a substantially straight cutting edge, which, with other characteristics of said cutter, cold works the metal of the severed spring to render the metal of the severed spring more advantageous for spring purposes. According to our present invention we likewise sever the spring metal by a cutter having a cutting edge which shears the metal. In the present invention the cutting edge of the cutter is not in a straight line when viewed from one side of the cutter, but varies in height at different points in the length of the cutter. This cutting edge not only compresses the metal in advance of the cut but causes some flow of the metal being cut along the edge of the cutter, while other characteristics of the cutter afford to the cut spring additional cold working which we have found advantageous in springs.

Other features, objects and advantages of our invention will be rendered apparent from an understanding of the following specification and the drawing.

In the drawing, in which like characters of reference indicate the same parts,

Fig. 1 is a top plan view of a portion of a lathe, or other turning tool, in the act of turning a helical spring having a central hole therethrough from the end of a tubular bar of metal with an independent stationary bar entering the hole in the bar to receive thereabout and support the spring as severed;

Fig. 2 is a plan view similar to Fig. 1, but showing the spring being turned from the end of a solid bar of metal, with the severed spring as the only shaving resulting from the operation, and leaving a central projection integral with the end of said bar for supporting the severed portion of the spring by its periphery engaging the central hole through the severed portion, all performed at a single operation;

Figure 1:
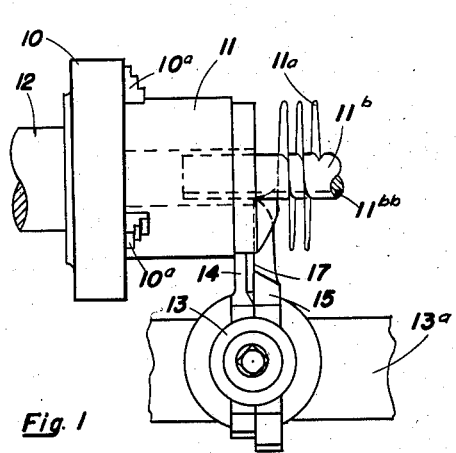
Figure 3:
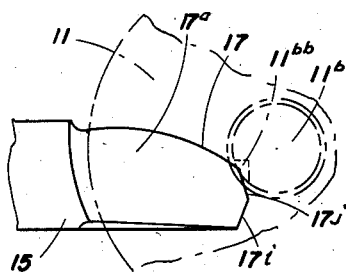
Fig. 3 is a side elevation view of the cutting portion of a turning tool employed in the instance shown in Fig. 1.

The revolvable spindle 12 of the usual or any conventional type of lathe, screw machine or other turning tool, may be fitted with chuck 10 provided with adjustable holding jaws 10a, or other suitable means, for securing thereto one end of a tubular bar of metal 11, in whose longitudinal opening extends a preferably rigid bar 11b, Figs. 1 and 3, having a notch 11bb in one side thereof. The shank 15 of a turning tool having a cutting edge 17 longitudinally disposed along the outer end thereof is suitably mounted in a conventional tool post 13 secured upon a carriage 13a with said edge 17 extending parallel with and in close proximity to an end of said bar 11, with the outer end of the turning tool provided with the cutting edge 17 extending from beyond the outer periphery to the cenral opening in bar 11, and may extend into said notch 11bb to insure the complete severance of the whole width of the spring from the end of bar 11. A turning tool 14 of usual construction is mounted in tool post 13 at the side of the turning tool 15 for turning true the outer surface of the bar 11 in advance of the severance of the spring 11a therefrom by the cutting edge 17 of the turning tool 15.

Figure 2:
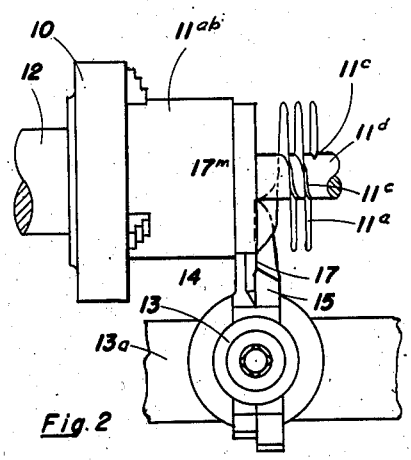

In Fig. 2 the bar 11ab of metal, from the end of which the spring 11a may be helically turned, is solid, and the outer end of the cutting edge 17 is so constructed as to sever the spring from the end of the bar at a point sufficiently removed from the longitudinal axis of the bar 11ab to form the central longitudinal hole through the spring 11a, and at the same time to form in the center of the end of the bar 11ab a projection 11d integral with the bar 11ab and of a diameter coincident with that of the central opening through the spring 11a. This projection 11d enables cheaper metal in the form of a solid bar 11ab to be used as the parent stock from the end of which the helical spring of our invention may be turned rapidly, economically and efficiently, instead of employing the more expensive metal in the form of tubular bar 11 shown in Fig. 1.

In each of Figs. 1 and 2 the tool post 13 rigidly mounted upon the carriage 13a, is moved longitudinally at a definite, desirable, predetermined rate proportionate to the revolvable movement of the bar 11 or 11ab, the relative rate of such longitudinal movement determining the thickness of the metal comprising the spring helices.

In each of Figs. 1 and 2 the spring 11a is the only shaving resulting from the operation of our invention, except where turning tool 14 is employed to true up the outer diameter of the bar 11 or 11ab. Thus, in accordance with our invention, practically no waste of metal occurs, as even the projections 11d, remaining after the solid bar 11ab has been turned completely into springs 11a, may be used as true turned stock which commands a high price in the metal market.

There are substantial differences in structure and characteristics between the turning tool 12 of our aforesaid application and the turning tool 15 of the present application, as well as between the like tools illustrated in Figs. 1 and 2.

Relative to our aforesaid application, the shavings of the prior art were wholly or mainly waste product, whose length was required to be broken up into relatively short pieces to preclude the possibility of personal injury to the operators of the machines, as well as damage to property. By our inventions the turned helical spring is the shaving comprising the useful spring, which is afforded desirable spring characteristics by the cold working of its constituent metal by the characteristics of the turning tool 12. The characteristics of the turning tool 15 of our present invention afford a cold working to the constituent metal of the spring 11a when severed from its parent bar 11 or 11ab, quite differently, by substantially different characteristics of said turning tool 15, to provide still different valuable properties for spring purposes to the severed spring 11a. One of these characteristics of our present invention is that the cutting edge 17 of the turning tool 15 does not extend in a straight line nor radially from the point of the neutral axis of the bar 11 or 11ab, or radially from a point approximately one thirty-second of an inch above or below such neutral axis, pursuant to the turning practice taught by the prior art for many years as essential to good turning; but the edge 17 varies in height at different points in the length of the turning tool. In the meanderings of cutting edge 17 to different heights at varying points in the length of the turning tool 15, such edge violates the teachings of the prior art by substantially departing from the requirement of the prior art for good turning that the cutting edge should be upon a line extending radially from the neutral axis of the bar from an end of which the shaving was to be cut, or extending radially from a point about one thirty-second of an inch above or below such neutral axis. In the instance shown in Fig. 3 the cutting edge 17 extends from within the recess 11bb of the stationary bar 11b to a point beyond the outer diameter of the bar 11. The metal of bar 11 at its central opening is engaged by the cutting edge 17 of the turning tool 15 at a point substantially below a horizontal plane passed through the neutrol axis of the bar 11, Fig. 3, and extends upwardly and outwardly across the end of bar 11 in a curved path in the instance shown. This curved path in such instance has its highest point substantially above said plane, and the metal of the outer edge of bar 11 is adapted to engage said edge 17 at a point above said plane and preferably below the highest point of said edge 17. In said instance, said edge 17 throughout its engagement with the metal of the end of bar 11, extends above a plane passed through the point of its engagement with the metal of bar 11 at its adjacent inner and outer edges, and which plane passes at a downward angle below the neutral axis of the bar 11. The metal of the turning tool 15, whose upper surface bears said edge 17, may be somewhat thinner than the body of the shank of said tool 15. Its lateral or side rake surface 17a, which extends downward at an angle from the edge 17, is beveled, and preferably slightly arched vertically and longitudinally as it extends from edge 17 downwardly and outwardly to the lower edge of the turning tool 15. The severed portion of spring 11a passes over and in firm contact with said surface 17a. The lateral clearance surface of the tool 15 is slightly beveled downwardly and away from said edge 17, commencing at a point below the hereinafter stated nicks 21, so as to avoid frictional contact of said surface with the end of bar 11 at any point in the extent of said bevel. While said edge 17 is sharp, it is supported by metal of tool 15 of substantial and progressively increasing thickness from said edge 17 to the bottom of tool 15. Consequently, in cutting the spring 11a the density of the metal of bar 11 immediately in advance of said edge 17, while such cutting is progressing, is increased in density by the force required for said cutting. This not only cold works at least a portion of the metal of the spring 11a being thus severed, but it likewise cold works the metal of the adjacent surface of the bar 11 which will comprise the portion of spring 11a to be subsequently cut from bar 11, in the instance that the spring 11a is a helical spring, or the surface of the succeeding spring where a flat or non-helical spring is to be cut according to our invention. It will be understood that the terms "cold worked" or "cold working," when employed herein, refer to the metal being cut being at substantially room or atmospheric temperature and substantially unheated, except that arising from the force and friction of cutting, which heat, in some respects, is appreciably and designedly increased by our invention.

The metal of the portion of spring 11a being severed by said cutting edge 17, being rendered of increased density at and above said cutting edge 17, as aforesaid, is passed at a sharp outward angle from the end of bar 11 by, over and downwardly across the surface 17a of the turning tool 15. This still further cold works the metal of the severed portion of the spring by increasing the density of the metal of the outer surface of the severed portion of the spring, and by slightly reducing the density, or stretching, the metal of the opposite surface of the severed portion of the spring which is in contact with said surface 17a of the turning or cutting tool 15. This last stated further cold working of the spring simultaneously with its severance from the bar 11 even visually transforms the appearance of the surface of the metal of the severed spring visible to the unaided eye, especially where the severed spring is of copper. Such transformation is most evident upon that surface of the severed portion of the spring which does not come in contact with the surface 17a of the turning tool or cutter 15. While the freshly cut or end surface of bar 11, which comprises the surface of the spring in question when the same is severed, is bright, the same is transformed at a point opposite the cutting edge 17 into a dull or frosted appearance progressively as the metal is being severed and commences to pass at a wide angle onto and over the surface 17a of the turning tool or cutter 15. This seems clearly to be due to the compression or further compression of the metal of such surface of the spring as the same is being severed. Simultaneously with such compression, the metal of the opposite surface of the spring being severed, at least a part of which was compressed and its density increased by the force incident to severing the spring from the bar 11, is somewhat stretched and polished as the beveled portion of the spring passes outwardly at a sharp angle from bar 11 and upon and over the surface 17a of the turning tool or cutter 15.

The cutting edge 17 of turning tool or cutter 15 being not in a straight line as viewed in side elevation, but of varying height at different points in its length, gives to the spring severed thereby from larger metal characteristics which we have found advantageous for spring purposes. Such characteristics, in addition to those heretofore indicated, typically are (a) that in the prior art turning practice where a metal shaving may be helically cut from an end of a bar, by a tool or cutter whose straight cutting edge usually extends radially from the neutral axis of such bar and the shaving breaks into short pieces, due to such radial cut and its action upon the metal of the bar which, in some metals, has a grain which is cross-cut at some points, and cut with the grain at other points about the circle of said bar. Where the grain is cross-cut by the process of the prior art, the shaving is broken by the process of cutting into small bits. However, by our invention even metal having a grain which may be cross-cut produces shavings which may be used as springs of substantial length, due to the before stated, as well as the hereinafter stated, characteristics which our invention affords to the severed spring;

(b), that the metal being severed by said edge 17 under the before stated substantial pressure of the cutting which results in the increased density of the metal about the cutting edge, also causes some flowage of particles of the metal longitudinally along said edge 17 from a higher to a lower point along said edge 17; (c) said edge 17 simultaneously and progressively cuts as well as stretches the metal of, and in the direction of the width of, the spring, or each helices thereof. The highest point of the cutting edge 17 severs a portion of the width of the spring, or spring helices, while portions of the bar 11 on opposite sides of such high point are still integral with and unsevered from the bar 11. Such partial severance necessarily results in a progressive stretching of the metal, due to the substantial angle, as well as outward lateral and longitudinal curvature of the surface 17a of the turning or cutting tool 15. Such surface 17a being associated with the high as well as other points in the length of the cutting edge 17, and the fact that portions of the metal of bar 11 on opposite sides of the high point in cutting edge 17 are still unsevered from the bar 11, the intermediate severed portion of the spring 11a is substantially stretched by and to the extent of the penetration of the surface 17a of tool 15 into the metal of the end of bar 11 before the edge 17 breaks through the inner and outer surfaces of the end of bar 11 being cut. The magnitude of such stretching may be determined in Figs. 3 and 7 by placing a straight edge across the points in cutting edge 17 contacted by the inner and the outer diameters of the bar 11 or the inner and outer edges of the spring or spring helices in the instance shown in Figs. 2 and 7, and by the thinness of the cutting edge 17 compared to the varying thickness of the tool in its extent between the points where the inner and outer edges of the severed spring contact the cutting edge 17. This progressive stretching the metal in the direction of the width of the spring occurs simultaneously and progressively with the aforesaid increasing density or compression stress upon the metal in the region at and slightly above the cutting edge 17, which latter tends to compress and stress the metal of the spring in a longitudinal direction; (d) additional cold working of the metal of the severed portion of the spring, as well as additional strength to the severed spring itself, we have attained by placing one or more nicks 21 in the cutting edge 17, as indicated in Figs. 7 through 10. Each nick 21 is associated with a groove 22 registering with each nick at one end and extending over the surface 17a of the tool 15. In the instance shown each of these grooves 22 are in the arc of a circle whose center is coincident with the neutral axis of the bar 11 or 11ab. Such nick or nicks 21 may be placed in the edge 17 of any form of the cutting edge of the tool 15. The nick or nicks 21 form no break in the vertical cutting face of the tool 15 at whose upper margin is the cutting edge 17, and consequently form no ridge upon the end of the bar 11 or 11ab, from the end of which the spring may be severed. In severing the spring with the cutter provided with the nick or nicks 21 and grooves 22 its cutting action is as heretofore described, together with that resulting from the nicks and grooves. In such cutting the edge 17 severs the metal in advance of the severance thereof by the bottoms of the nicks 21. This results in the metal severed by the edge 17 being started to flow therefrom into and over the initial portion of the surface 17a, while the portion of cutting edge 17 forming the edge of the nicks 21 is receiving the metal and commencing to cut the same from the bar 11 or 11ab. As the metal within the groove or grooves 22 is severed it started to extend along such groove or grooves, in which the metal initially filling the initial edge of each groove 22 proceeds to extend along each such groove 22 and to stretch the metal lying in each such groove 22. This pressure of the cutting and sliding of the metal in and along each groove results in the formation along the length of the spring 11a of a corrugation 23 for each nick 21 and groove 22 in the tool 15. The convex side of the corrugation 23 conforms to the shape of the groove 22, while the opposite concave portion thereof is not defined by direct contact with any part of the tool 15 but results merely from the stretching of the metal of the spring 11a by the force of cutting the metal included within each groove 22 by the cutting edge 17, which forms each nick 21, and which results in the formation of the convex side of grooves 22 and corrugation 23 in spring 11a.

Each of the before mentioned forms of cold working the metal transforms the characteristics of the metal of the severed spring 11a from the metal of the bar 11 or 11ab from which the spring is cut. Each of these transformation is produced simultaneously with the cutting of the spring, and extend continuously throughout the length of the severed spring, and afford to the metal of the severed spring characteristics which we have found very advantageous for spring purposes. One or more of these characteristics may be imparted to the spring according to the character and requirements of such service; while all of such characteristics enable the spring to function satisfactorily under severe service conditions.

In connection with Figs. 1 and 3, wherein the spring 11a is severed from the end of tubular bar 11 and the outer or tip end of the turning tool or cutter 15 which extends within the bore of tubular bar 11 and into the notch 11bb of rigid bar 11b, whose end extends within the bore of said bar 11 while the periphery of bar 11b receives and supports from lateral vibration the helical coils of spring 11a as severed from the end of bar 11, such outer or tip end of the tool 15 performs no function. However, to equip the tool 15 of Figs. 3 and 4 for dispensing with said bar 11b by cutting the same from the end of the solid bar 11ab, Fig. 2, and leaving a central integral projection 11d of bar 11ab to support from lateral vibration the spring 11a as severed progressively from the end of bar 11ab, such outer or tip end is provided with a terminal surface 17h extending downwardly from the outer end of cutting edge 17, which edge 17 is joined at its outer end by a cutting edge 17j which forms the outer margin of the beveled surface 17a of said tool 15. Below said surface 17h, the tool 15 is provided with an outer surface 17i which extends to the bottom edge of the tool 15 and supports the metal of the outer end of tool 15 having the surface 17h, the downwardly and laterally extending cutting edge 17j and the outer end of the cutting edge 17.

To helically turn or cut a helical spring 11a from the end of solid bar 11ab, Fig. 2, the point or outer cutting end of the tool 15, represented by the juncture of the cutting edges 17 and 17j, is adjusted across the outer end of bar 11ab until said juncture is brought to the point within the circumference of bar 11ab to define the diameter of said projection 11d of bar 11ab, as well as the edge of the central opening through the spring to be severed. Whereupon, the bar 11ab and said tool 15 are relatively rotated and longitudinally moved. Thereupon the cutting edge 17 of tool 15 commences to cut the lateral surface of spring 11a from the end of solid bar 11ab, and simultaneously therewith the cutting edge 17j commences to cut the inner edge of the spring 11a from the bar 11ab, which simultaneously forms the central opening through the spring and the integral projection 11d of bar 11a which occupies such central opening, and precludes the lateral vibration of the severed portion of the spring which would otherwise result from the rapid rotation and helical cutting. The cutting edge 17j directly joining with the outer end of the longitudinal cutting edge 17 of the tool 15 results in the formation of a square or right angled edge 11e of spring 11a, Fig. 13.

Figures 4, 5, 6:
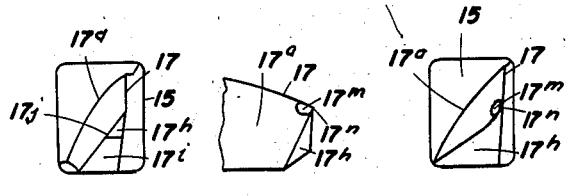
Fig. 4 is a front or outer end elevation view of the turning tool shown in Figs. 1 and 3.
Fig. 5 is a side elevation view of the outer portion of the turning tool shown in Fig. 2.
Fig. 6 is an elevation view of the outer end of the turning tool shown in Figs. 2 and 5.
Figures 8, 9, 10:
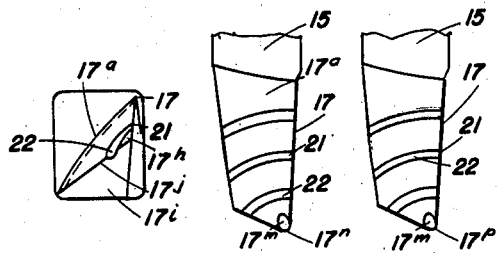
Fig. 8 is an end elevation viewed from the outer end of the turning tool shown in Figs. 2 and 7.
Figs. 9 and 10 are top plan views of modified forms of the outer portion of the turning tool shown in Figs. 2 and 5.
Figure 11:
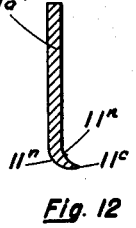
Fig. 11 is a side elevation view of a portion of a helical spring made and characterized according to our invention.

We have further found that said cutting edge 17j of tool 15 may be dispensed with by providing the outer end of the tool 15 with a curve 17n, Figs. 5, 6 and 9, which joints with and extends laterally from the outer end of cutting edge 17. The lateral extent of said curve 17n exceeds the thickness of the metal of the spring 11a to be severed from thicker metal, and the outer edge of the curve 17n is a cutting edge. In the tip or outer end of tool 15 comprising said curved cutting edge 17n is a nick 17m. In the employment of the tool 15, shown in Figs. 5 and 9, an initial cut is made upon the outer end of bar 11ab by the tool having the joined cutting edges 17, 17n, in which the curved cutting edge 17n forms upon the end of bar 11ab a flat annular surface represented by the edge 17 having at its inner margin a curve 17n, Fig. 14. In the cutting of the spring 11a from such bar the inner edge of the spring, which forms the central opening through the helically cut spring, is formed by two like curved surfaces 17n, Fig. 14, whose somewhat parallel surfaces are spaced apart conformable to the thickness desired of the metal of the spring. At the inner edge of the helical spring 11a, which forms the central opening through the spring, the curves 17n merge into each other, and this point of merger defines the periphery of the integral projection 11d of the bar 11ab as well as the opening through the spring, and also forms the lateral projection 11c of spring 11a. This curved cutting edge 17n and nick 17m also cold work the metal of the edge of the spring forming the projection 11c and between the curves 17n. In such cold working the nick 17m greatly increases the top rake or bluntness of the beveled surface 17a of tool 15. This increased bluntness greatly increases in the region of said nick 17m the density of the metal at and in advance of being cut by the cutting edges 17, 17n, which border the nick 17m, due to the substantial increase of the force required to sever the metal in the region of nick 17m, due to the increased bluntness of the surface 17a afforded by the nick 17m. Said cold working also produces in the severed spring characteristics which we have found to be advantageous for spring purposes.

Figures 12, 13, 14:
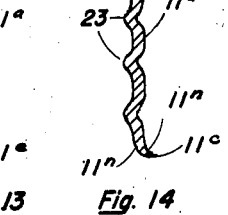
Figs. 12, 13 and 14 are enlarged cross sectional views of modified forms of the metal comprising the spring helices.

In Fig. 10 is shown a modified form of the cutter shown in Figs. 5 and 9, in which the curved cutting edge 17n is dispensed with and a short cutting edge 17p is substituted therefor which at one end joins at a right angle the outer end of cutting edge 17, and its remaining end extends to the width of the nick 17m which exceeds the width of the spring to be cut and produces a square or right angled edge of the spring, as shown at 11e in Fig. 13. Simultaneously with the formation of this inner edge 11e of spring 11a by said cutting edge 17p and its accompanying nick 17m, Fig. 10, the metal comprising such edge is cold worked substantially the same as described in connection with Figs. 5, 6, and 9.

Figure 7:
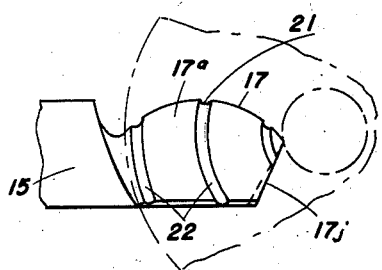
Fig. 7 is a side elevation view of a modified form of the turning tool shown in Figs. 2 and 5.

In Fig. 3 the cutting edge 17 of tool 15 dips or meanders mainly downward toward the central portion of the bar 11, which causes a flowage of metal along cutting edge 17 mainly toward the center of bar 11. However, in Figs. 7 and 8 is illustrated a tool 15 whose cutting edge 17 is highest at a point at or near the center of the width of the spring to be cut. From this high point the cutting edge 17 dips or meanders in opposite directions toward the opposite edges of the spring to be cut. In this case, the flowage of some of the metal being cut occurs along the edge 17 in opposite directions on opposite sides of the high point of the cutting edge 17, which is toward opposite edges of the spring being cut. In this latter case, the cold working by the flowage of the metal along the cutting edge, as well as the progressive stretching in the direction of the width of the spring, of the metal of the spring being severed, renders more uniform these cold workings throughout the width of the metal of the severed spring, and increases the advantageous characteristics of the severed metal for spring purposes.

In the beveled surface 17a of any of the tools 15 illustrated, any number of grooves 22 may be formed with their registering nicks 21 in the cutting edge 17.

While in our before-mentioned application, the grooves 22 are not disclosed as concentric with the neutral axis of the bar 11 or 11ab, such grooves 22 are herein shown to be curved, and which curves may be or approximate to concentric with such neutral axis.

Cutting tools cutting in a continuous straight line, where, for instance, the cutting tools are mounted in a machine tool known as a shaper or a planer, and which cutting tools have the characteristics, or any of them, of the herein disclosed cutting tool 15, will cut a straight spring of our invention from a larger piece of metal and simultaneously cold work the same to thereby afford characteristics in the metal of the spring which we have found very advantageous for spring purposes.

It will be understood from the foregoing, by those skilled in this art, what comprises our method, and the transformed characteristics of the metal of the severed spring. It will likewise be understood herefrom that the cutting edge 13 of tool 12 of our before-stated application does not make a shear cut, and that the cutting edges 17 and 17n of our present application do make a shear cut; that the cutting edges 17 of tool 15 of the present application may fairly be said to meander throughout the width of the spring to be cut and that its line of cleavage in the metal being severed may likewise be characterized; that the cutting edge 17 is adapted to meander somewhat radially into the end of the metal bar and to cut and simultaneously cold work progressively the lateral surfaces of the spring, while the cutting edge of tool 14, as well as the cutting edge 17n of Figs. 5, 6 and 9, the cutting edge 17j of Figs. 3, 4, 7 and 8, and the cutting edge 17p of Fig. 10, each may fairly be said to extend longitudinally of the bar, said edge of cutter 14 functioning to machine and define the outer edge of the spring when severed, and the remaining designated cutting edges functioning to machine and define the inner edge of the spring as severed; while in Fig. 1, and in dotted lines in Fig. 3, wherein the spring is turned from the end of a hollow or tubular bar, the bore of the tube defines the inner edge of the spring when severed; and that the cold working of the metal occasioned by the cutting of the spring beneficially affects the metal of the spring which is being severed, as well as the surface of the metal of the end of the bar from which the spring is being severed, and that in making a helical cut, after making the first substantially full helices, which may be removed in cases where not adapted for the service requirements of a particular spring, both lateral surfaces of the spring helices are equally cold worked by the act of cutting the spring in addition to the other species of cold working heretofore described.

We have furthermore observed that a helical spring made with a cutter disclosed in Figs. 3 to 6, inclusive, by cutting from the end of a tubular bar the inner and outer diameters of the helical spring, will be less than the outer and inner diameters of the tubular bar from which the same is being cut, due to the major slope of the cutting edge 17 of the cutting tool being toward the center of the bar 11; and that when such major slope is toward the outer edge of the tubular bar, the inner and the outer diameters of the severed spring are somewhat larger than those of the bar from which the spring is being severed; and that in each case of inequality in the diameters of the severed spring and the bar from which the spring was severed, the edges of the severed spring and of the bar from which it is cut coincide only progressively around the end of the bar as the spring is being severed. In the case of the spring being cut smaller than the diameter of the bar from the end of which the same was cut, the diameter of the stationary spring supporting bar 11b is correspondingly decreased.

The angles formed by the various faces of the tool 15 relative to its cutting edge 17 are considered as the surface 17a being the side rake, and the one extending at a slight angle below the edge 17 is the clearance. In the cutter of Figs. 3, 4, 7, and 8, the cutting edge 17j forms the outer edge of the side rake, while the surface 17h, Fig. 4, extending downward and slightly inward from edge 17j is the clearance. In the cutter of Figs. 5, 6, 9, and 10, the cutting edges 17n and 17p are each provided respectively with clearances which are, as will be understood by those skilled in the art herefrom, continuations of the clearance of the edge 17. The neck 17m, in the instances shown in Figs. 5, 6, 9, and 10, initially increases the top rake normally afforded by the surface 17a.

It will be understood that in the instances shown in Figs. 2 and 3 the cutting angle of the tool 11ª, as well as its side rake angle represented by its surface 14a, are each normal for the material to be cut by the tool, but that the cutting edge or edges are provided with means 12b, 21 and 22, for increasing the effect of the top as well as side rakes of the cutter upon the material being cut by the tool. Such effect is to increase the cutting thrust of the cutter upon the metal being cut, which cold works the metal being cut into an increased strength and toughness and as hereinbefore described.

Before our invention it was unknown that solely by cutting or turning a metal article, or a shaving therefrom, that such article or shaving may possess greater strength, toughness, surface density and finish, as well as resistance to corrosion and wear than was possessed by the parent metal before being so cut or turned, and that such cut or turned metal was advantageous and economical for spring purposes.

We were first in the art to make a spring from a cheap form of cold workable metal or alloy normally unadapted for spring purposes, and to cold work the same into the desired shape and form of the required spring, which cold working transformed the characteristics of such metal into those which we have found beneficial and advantageous for spring purposes.

We are aware of a prior practice, termed "Auto frettage," wherein high pressure liquid is directly applied within an ordnance bore to outwardly stress and stretch the metal of the wall of such bore beyond its elastic limit, but below its fracture point, to thereby transform the characteristics of such metal by imparting thereto increased strength and toughness. In such practice, no cleavage of metal is involved, and every precaution is exercised to avoid any fracture or cleavage of metal therein, as the same destroys the utility of the manufactured bore which is subsequently subjected to such practice.

In our invention, cleavage controlled to a line conforming to a cut or turned surface of the metal of a required spring is a very desirable part of our invention. Such cleavage is occasioned by stressing the metal along such line of cleavage at least to its shearing point, while at least the metal adjacent such line is subjected to compression stress beyond its elastic limit, but below its fracture point, which stress occasions a flowage of metal at least adjacent such line, although such metal may be at room temperature but for said stress. We have found that such stress may be associated with and occasioned by an abnormal cleavage of the spring from a larger piece of metal, whose normal characteristics are unadapted for spring purposes, and that such cleavage beneficially transforms the characteristics of the metal so stressed and cleaved into a spring and into characteristics which we have found advantageous for spring purposes. While said stressing of the metal involves the application of force in excess of that required for the normal cutting or turning of a like extent of similar metal, the magnitude of such stress required to cut or turn a spring is very materially reduced by the stressing being progressively and successively applied to different relatively small areas which may extend throughout a surface or surfaces of the metal being cleaved into a spring. Such reduction in the magnitude of such stress also reduces the magnitude of the power required in the practice of our invention, as well as reduces the wear upon the machine and cutting tools which may be required for the practice of our invention.

While we have illustrated several forms of cutting or turning tools for the different cutting edges and other features, all of such features may be associated, when desired, with and in the cutting edges of a single tool.

This is a divisional application of our copending application Serial No. 178,699 filed December 8, 1937.

The invention described herein may be manufactured and/or used by or for the Government of the United States of America for governmental purposes without the payment of any royalties thereon or therefor.

We claim:

1. A cut spring comprising an integral metallic member having a flange extending along an edge thereof, the entire lateral surfaces of said member being formed by a cutting operation and cold worked by the cutting.

2. A cut spring comprising a helical integral metallic member having a flange extending along one edge thereof, the entire lateral surfaces of said member being formed by a cutting operation and cold worked by the cutting.

ALFRED J. BERG.
JOHN O. HUSE.